(12) United States Patent
Drocco

(10) Patent No.: US 9,516,884 B2
(45) Date of Patent: Dec. 13, 2016

(54) BOWL FOR A KNEADING MACHINE

(71) Applicant: Sancassiano S.p.A., Roddi d'Alba (Cuneo) (IT)

(72) Inventor: Davide Drocco, Alba (IT)

(73) Assignee: SANCASSIANO S.P.A., Roddi d' Alba (Cuneo) (IT)

( * ) Notice: Subject to any disclaimer, the term of this patent is extended or adjusted under 35 U.S.C. 154(b) by 179 days.

(21) Appl. No.: 14/478,812

(22) Filed: Sep. 5, 2014

(65) Prior Publication Data

US 2015/0063055 A1 Mar. 5, 2015

(30) Foreign Application Priority Data

Sep. 5, 2013 (IT) .............................. TO2013A0716

(51) Int. Cl.
*A21C 1/14* (2006.01)
*B01F 15/00* (2006.01)

(52) U.S. Cl.
CPC .............. *A21C 1/149* (2013.01); *A21C 1/144* (2013.01); *A21C 1/1485* (2013.01); *B01F 15/00811* (2013.01)

(58) Field of Classification Search
CPC ... A21C 1/144; A21C 1/1485; B01F 15/00811
See application file for complete search history.

(56) References Cited

U.S. PATENT DOCUMENTS

| 221,364 | A | * | 11/1879 | Ruger | ................. | B01F 15/0267 366/193 |
| 1,518,129 | A | * | 12/1924 | Banbury | ................. | B29B 7/183 366/132 |
| 1,663,830 | A | * | 3/1928 | Ludwig | ............. | B01F 15/00811 251/229 |
| 1,728,598 | A | * | 9/1929 | Ludwig | ............. | B01F 15/00811 251/144 |
| 1,737,301 | A | * | 11/1929 | Ludwig | ............. | B01F 15/00811 366/193 |
| 2,722,405 | A | * | 11/1955 | William | ................. | A47J 43/04 366/155.1 |

(Continued)

FOREIGN PATENT DOCUMENTS

DE 172211 11/1905
DE 19512187 A1 10/1996

(Continued)

OTHER PUBLICATIONS

Italian Search Report for corresponding Italian Patent Application No. TO20130716 completed on May 23, 2014.

*Primary Examiner* — Tony G Soohoo
(74) *Attorney, Agent, or Firm* — Heslin Rothenberg Farley & Mesiti P.C.; Victor A. Cardona, Esq.

(57) ABSTRACT

A bowl for a kneading machine includes a bottom provided with an opening, a discharge device equipped with a plug, and an actuator configured for moving the plug between a position for closing the opening, in which the latter is engaged by the plug, and a position of discharge of the bowl, in which the opening is disengaged from the plug so as to be able to discharge through it the dough prepared in the machine. The actuator is a linear actuator configured for moving the plug, and cam means are configured for guiding movement of the plug along a path comprising a horizontal rectilinear stretch.

14 Claims, 4 Drawing Sheets

(56) References Cited

U.S. PATENT DOCUMENTS

| | | | | |
|---|---|---|---|---|
| 3,854,627 | A | * | 12/1974 | Coons ................... A21O 5/00 222/1 |
| 4,010,932 | A | * | 3/1977 | Otto ..................... B01F 7/045 366/139 |
| 4,504,152 | A | * | 3/1985 | Moller ................... A21C 1/02 366/188 |
| 4,630,930 | A | * | 12/1986 | Seiling ................... A21C 1/06 366/189 |
| 4,650,337 | A | * | 3/1987 | Otto ..................... A21C 1/06 241/101.8 |
| 5,322,368 | A | * | 6/1994 | Tanaka .............. B01F 15/00792 241/101.8 |
| 6,915,734 | B2 | * | 7/2005 | Torghele ................ A21C 1/06 99/348 |
| 2015/0063055 | A1 | * | 3/2015 | Drocco ................ A21C 1/144 366/77 |

FOREIGN PATENT DOCUMENTS

| | | |
|---|---|---|
| DE | 19757311 A1 | 7/1999 |
| FR | 970328 A | 1/1951 |
| GB | 172513 | 12/1921 |

\* cited by examiner

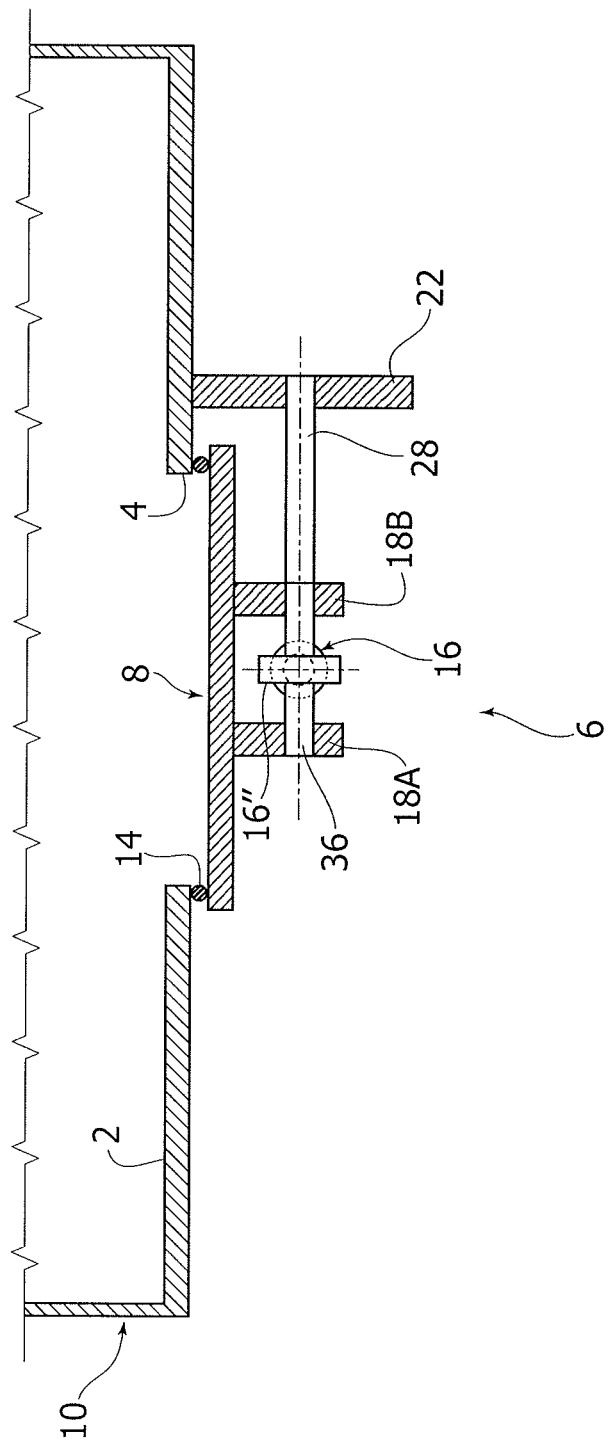

BOWL FOR A KNEADING MACHINE

CROSS REFERENCE TO RELATED APPLICATIONS

This application claims priority from Italian patent application No. TO2013A000716 filed on Sep. 5, 2013, the entire disclosure of which is incorporated herein by reference.

FIELD OF THE INVENTION

The present invention relates to a bowl for a kneading machine, comprising a bottom provided with an opening, and a discharge device equipped with a plug and with actuator means configured for moving said plug between a position for closing said opening, in which the latter is engaged by the plug, and a position of discharge of the bowl, in which the opening is disengaged from the plug so as to be able to discharge through it the dough prepared in the aforesaid bowl.

PRIOR REFERENCE ART

A bowl of the type referred to above is, for example, described in the patent application No. DE19757311A1. In the solution described in this document, the actuator means are arranged on the top side of the bowl and comprise a linear actuator and a lever mechanism designed to convert the rectilinear motion of the actuator into a movement of oscillation of the plug about a horizontal axis. The lever mechanism is connected to the plug via a shall passing within the bowl, associated to which are motor means. In the opening position, the plug is in contact with a scraper element and in said condition is set in rotation by the aforesaid motor means so that the scraper element comes to slide on the plug, removing any possible residue of dough present thereon.

OBJECT AND SUMMARY OF THE INVENTION

The object of the present invention is to provide a bowl equipped with a discharge device that is simpler from a constructional standpoint and less cumbersome. Preferred embodiments of the invention moreover have the purpose of providing a discharge device that is able to carry out an operation of cleaning of the plug without the aid of further purposely dedicated actuator means.

The purposes outlined above are achieved via a bowl which has the characteristics specified in the claims.

The claims form an integral part of the technical teaching provided herein in relation to the invention.

BRIEF DESCRIPTION OF THE DRAWINGS

Further characteristics and advantages of the invention will emerge clearly from the ensuing description with reference to the annexed drawings, which are provided purely by way of non limiting example and in which:

FIG. 4 illustrates a partial cross-sectional view of the bowl of FIG. 1 according to a vertical plane orthogonal to the plane of section of FIGS. 1 to 3.

DETAILED DESCRIPTION OF THE INVENTION

Figure 1:
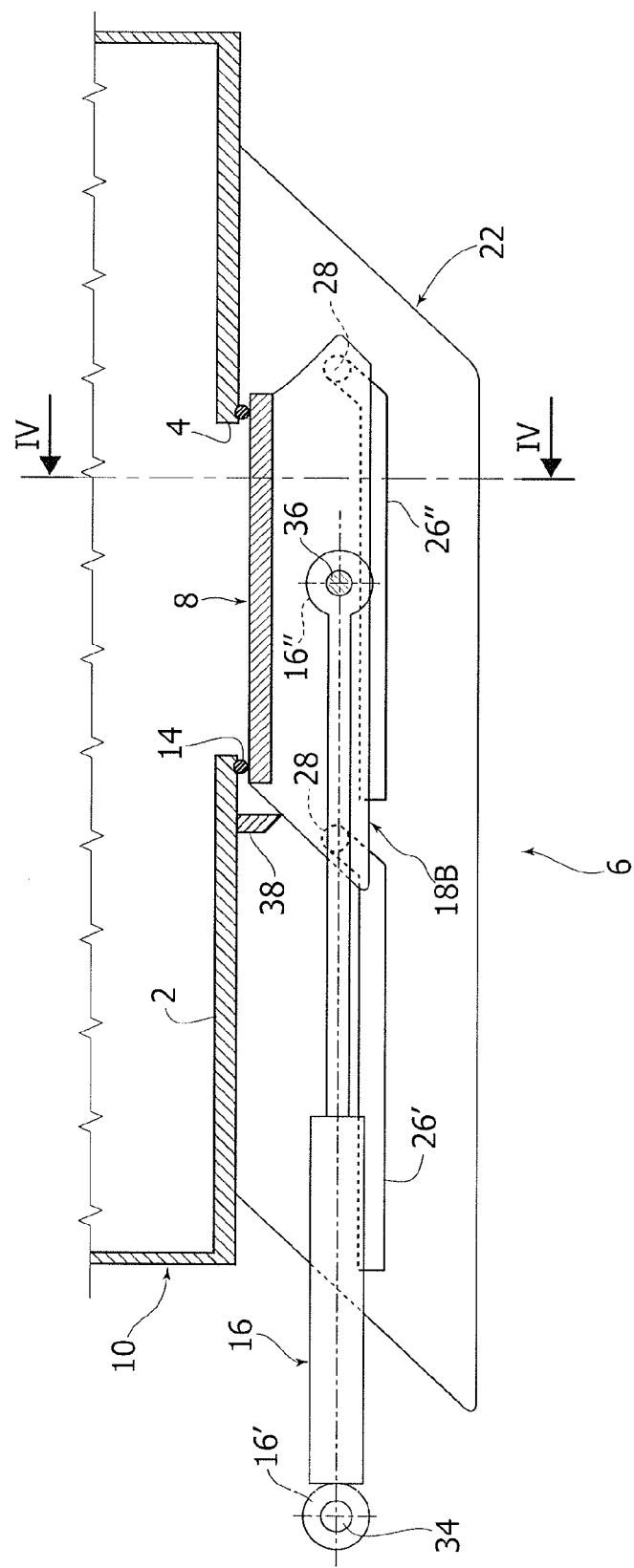
FIGS. 1 to 3 are respective partial views of the bowl described herein and of the discharge device associated thereto in different operating configurations.

Illustrated in the ensuing description are various specific details aimed at providing an in-depth understanding of the embodiments. The embodiments may be provided without one or more of the specific details, or with other methods, components, or materials, etc. In other cases, known structures, materials, or operations are not illustrated or described in detail so that various aspects of the embodiment will not be obscured.

The references used herein are provided only for convenience and hence do not define the sphere of protection or the scope of the embodiments.

With reference to the figures, the reference number 10 designates a bowl for a kneading machine, comprising a bottom 2 provided with an opening 4, and a device 6 configured for discharging the dough prepared in the bowl through the opening 4.

The discharge device 6 comprises a ping 8 configured for closing the opening 4 and actuator means configured for moving the plug 8 between a position for closing the opening 4 (illustrated in FIG. 1), in which the latter is engaged by the plug 8, and a position of discharge of the bowl (illustrated in FIG. 3), in which the opening 4 is disengaged from the plug 8 so as to enable passage of the dough through it. In preferred embodiments, as in the one illustrated, applied on the underside of the bottom 2 is a gasket 14 that surrounds the opening 4e and is engaged by the plug 8 in the closing position, thus ensuring hermetic closing of the opening 4.

In various embodiments, as in the one illustrated, the discharge device 6 comprises a linear actuator 16 configured for moving the plug 8, as well as earn means configured for guiding movement of the plug 8 along a predetermined path.

In various embodiments, as in the one illustrated, the aforesaid cam means comprise a stationary structure 22 having at least one cam track, and a slider assembly 18 which carries the plug 8 and which engages said cam track.

In various embodiments, as in the one illustrated, the stationary structure comprises two identical cam tracks 26', 26", arranged aligned and/or parallel and shifted, both of which are engaged by the slider assembly 18. The term "shifted" is to be understood herein as describing a mutual arrangement of the tracks such that the tracks themselves, if these are contained in one and the same plane of the structure 22, or else their projections in one and the same theoretical plane parallel to their respective planes, if the tracks are contained in different planes of the structure, are found to be displaced with respect to one another in any direction of said plane of the structure 22 or of the aforesaid theoretical plane. As will be seen hereinafter, this configuration enables the plug 8 to be kept in a constant orientation during its movement.

In various preferred embodiments, as in the one illustrated (see in this connection FIG. 4), the stationary structure 22 comprises at least one wall 22 set alongside the assembly 18 and bearing the two cam tracks 26', 26" facing the assembly 18.

The slider assembly 18 comprises a first support 18A and a second support 18B arranged alongside one another in a direction transverse to the wall 22, to which the plug 8 is fixed at its underside; carried in cantilever fashion by the two supports are two pins 28 that come to engage the cam tracks 26', 26" of the wall 22.

The mutual engagement of the pins 28 and of the cam tracks 26', 26" provides a vertical support for the slider assembly 18 and, during operation of the device, determines the path of movement of the assembly 18 and of the plug 8 between the opening position and the closing position.

In various embodiments, as in the one illustrated, the linear actuator 16 has a first end 16' mounted oscillating about a stationary pivot 34 set underneath the bottom of the bowl, and a second end 16" mounted oscillating on the slider assembly 18. In various preferred embodiments, as in the one illustrated, the second end of the actuator 16 is mounted oscillating on a pivot 36 that connects together the support 18A and the support 18B. The actuator 16 may be of any type known to the person skilled in the sector, for example a cylindrical actuator, a screw actuator, etc.

Figure 2:
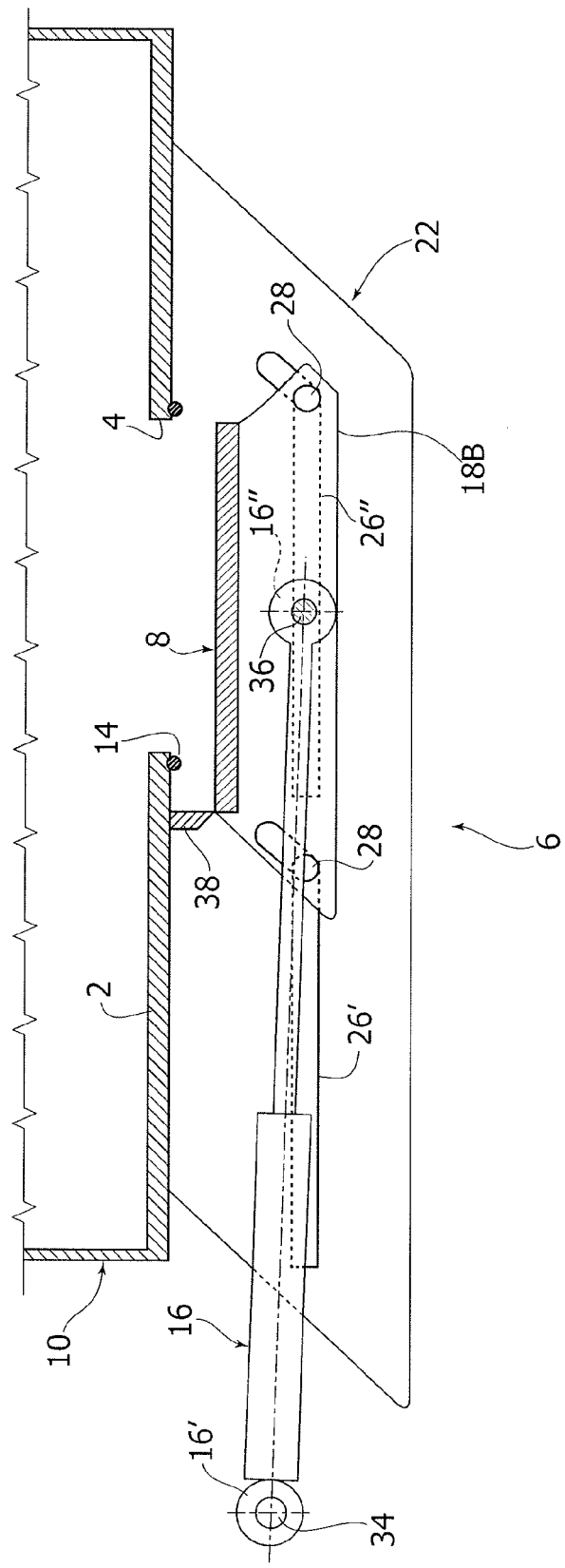
Figure 3:
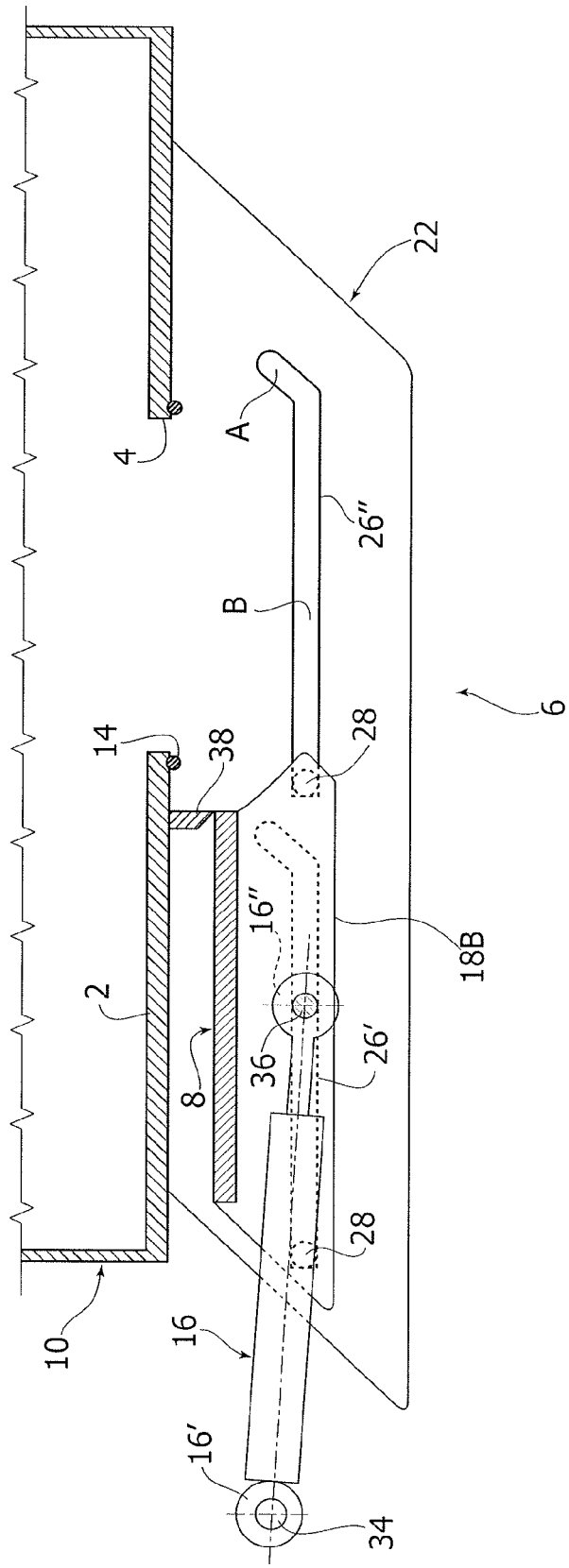

As illustrated in FIGS. 1 to 3, passage of the actuator from its extended configuration to its contracted configuration brings about displacement of the plug 8 from the closing position illustrated in FIG. 1 to the opening or discharge position illustrated in FIG. 3, and vice versa.

It should be noted that it is likewise possible to envisage alternative embodiments in which the stationary pivot referred to above, on which one end of the actuator is mounted oscillating, is instead positioned above the bottom of the bowl. In this case, passage of the actuator from its extended configuration to its contracted configuration will bring about displacement of the plug 8 from its opening position to its closing position.

As has been said, the path followed by the plug 8 during operation attic actuator 16 is determined by co-operation of the slider assembly 18 and the cam tracks 26', 26" engaged thereby.

In various embodiments, as in the one illustrated (see FIGS. 1 to 4), the cam tracks 26', 26" are configured in such a way that the path followed by the plug 8 comprises a horizontal rectilinear stretch. In this connection, with reference to the figures, each cam track comprises in succession, with respect to a displacement of the plug from the closing position of FIG. 1 to the opening position of FIG. 3, a first descending inclined stretch A, which has a horizontal component in a given direction, and a second horizontal stretch B in the same direction as the horizontal component of the first stretch.

With reference to FIGS. 1 to 3, actuation of the discharge device for bringing the plug 8 from its closing position (illustrated in FIG. 1) to its opening position (illustrated in FIG. 3) hence brings about a movement of the plug 8 comprising a first displacement downwards (from the position of FIG. 1 to the position of FIG. 2) and a second displacement in a horizontal direction (from the position of FIG. 2 to the position of FIG. 3); these displacements reproduce the course of the stretches A and B of the cam tracks 26', 26". During its movement, the plug 8 is kept with a constant horizontal orientation.

In the light of the foregoing, the discharge device described herein is hence characterized by simple and compact means, which can be installed completely underneath the bottom of the bowl and are able to move the plug within a contained space and in the direct proximity of the bottom itself.

In various preferred embodiments, as in the one illustrated, a scraper element 38 is set underneath the bottom of the bowl in a position such that it slides over the surface of the plug when the latter is moved along the aforesaid horizontal rectilinear stretch, so as to exert an action of cleaning of the plug by scraping. This action is thus obtained simultaneously with the step of opening of the bowl and, as has been seen, exploits operation of the very actuator of the device that is designed to move the plug.

Once discharge of the bowl has been completed, the device 6 brings the plug 8 back into the closing position, displacing it along the same path that it followed to move into the opening position, but in the opposite direction.

Of course, without prejudice to the principle of the invention, the details of construction and the embodiments may vary even significantly with respect to what has been illustrated herein purely by way of non-limiting example, without thereby departing from the scope of the invention, as defined by the annexed claims. For instance, it is possible to envisage a stationary structure 22 comprising two walls each provided with the cam tracks 26', 26" or else having as a whole the two cam tracks, one per wall. These walls are arranged on the opposite sides of the slider assembly 18 and, together, support and guide it in the movements of opening and closing of the plug 8 described above. It should moreover be noted that the bowl described herein may also be a rotary bowl; in this case, the plug 8 is mounted on the slider assembly 18 via interposition of supporting means designed to enable the plug to turn together with the bowl when the plug is in the closing position.

The invention claimed is:

1. A bowl for a kneading machine, comprising
  a bottom provided with an opening;
  a discharge device equipped with a plug;
  an actuator configured for moving said plug between a position for closing said opening and a position for discharge of the bowl, in which said opening is disengaged from said plug so as to be able to discharge the product contained in said bowl through said opening; and
  cam means configured for guiding movement of said plug along a predetermined path;
  wherein said cam means comprise a stationary structure provided with at least one cam track, and a slider assembly which carries said plug and engages said path; and
  wherein, with reference to the direction of displacement of said plug from said closing position to said discharge position, said cam track comprises at least one descending stretch followed by a horizontal rectilinear stretch.

2. The bowl according to claim 1, wherein said predetermined path comprises a rectilinear stretch.

3. The bowl according to claim 2, wherein said predetermined path comprises a horizontal rectilinear stretch.

4. The bowl according to claim 3, further comprising
  a scraper element set fixed underneath the bottom of said bowl, in a position such that it acts so as to scrape away any possible residue of dough present on the top surface of said plug when the latter is moved along said horizontal rectilinear stretch.

5. The bowl according to claim 1, wherein said cam means are configured for keeping said plug with a constant orientation during its movement.

6. The bowl according to claim 1, wherein said stationary structure comprises a further cam track identical to said at least one cam track, which, with respect to the latter, is parallel, and/or aligned, and shifted, and which is also engaged by said slider assembly.

7. The bowl according to claim 6, wherein, with reference to the direction of displacement of said plug from said closing position to said discharge position, said cam track comprises at least one descending stretch followed by a horizontal rectilinear stretch.

8. The bowl according to claim 6, wherein said actuator is a linear actuator, and has a first end mounted oscillating about a stationary pivot and a second end mounted oscillating on said slider assembly, in such a way that passage of said actuator from its extended condition to its contracted condition brings about displacement of said plug from said closing position to said discharge position, or vice versa.

9. The bowl according to claim 6, wherein said stationary structure comprises two walls, which are arranged at the opposite sides of said slider assembly and are each provided with said at least one cam track engaged by said slider assembly.

10. The bowl according to claim 1, wherein said actuator is a linear actuator, and has a first end mounted oscillating about a stationary pivot and a second end mounted oscillating on said slider assembly, in such a way that passage of said actuator from its extended condition to its contracted condition brings about displacement of said plug from said closing position to said discharge position, or vice versa.

11. The bowl according to claim 10, wherein said stationary structure comprises two walls, which are arranged at the opposite sides of said slider assembly and are each provided with said at least one cam track engaged by said slider assembly.

12. The bowl according to claim 1, wherein said actuator and said cam means are arranged underneath the bottom of said bowl.

13. The bowl according to claim 1, wherein said bowl is of a rotary type, wherein said plug is brought by said cam means in a condition where said plug turns together with the bowl.

14. The bowl according to claim 1, wherein said stationary structure comprises two walls, which are arranged at the opposite sides of said slider assembly and are each provided with said at least one cam track engaged by said slider assembly.

* * * * *